Oct. 10, 1933.  W. C. REA  1,929,608
DRILL BIT AND METHOD OF MAKING THE SAME
Filed Aug. 14, 1931   2 Sheets-Sheet 1
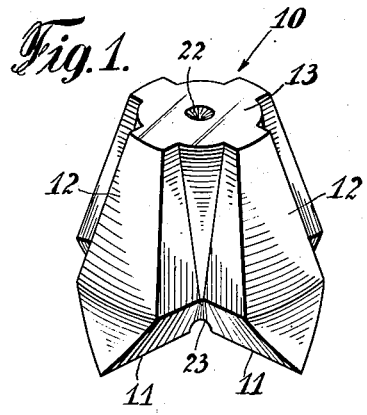
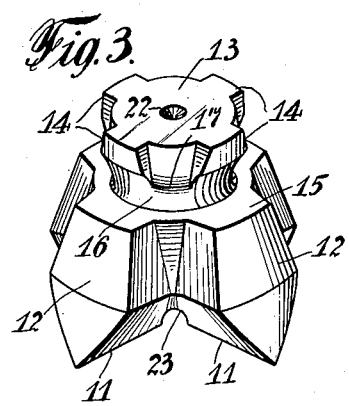
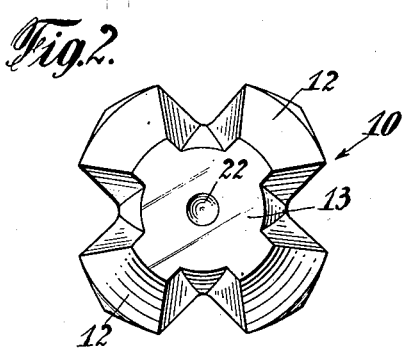
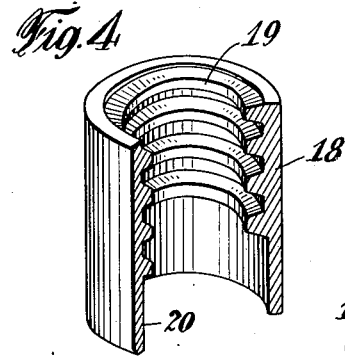
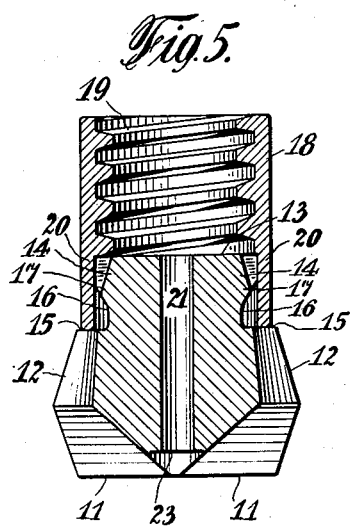
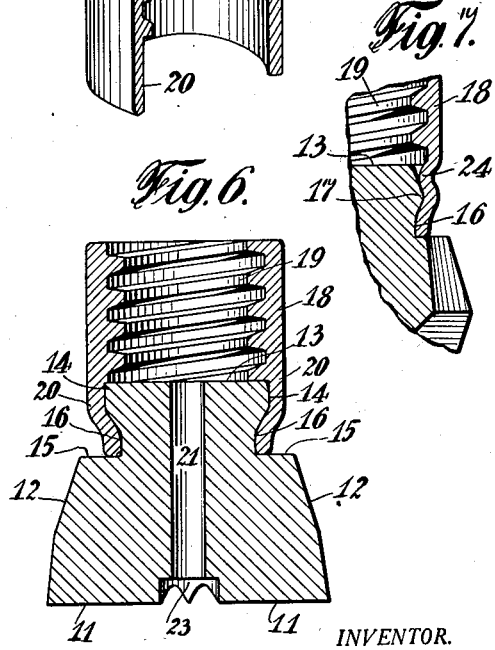
INVENTOR.
Walter C. Rea
BY Ramsey & Kent
ATTORNEYS.

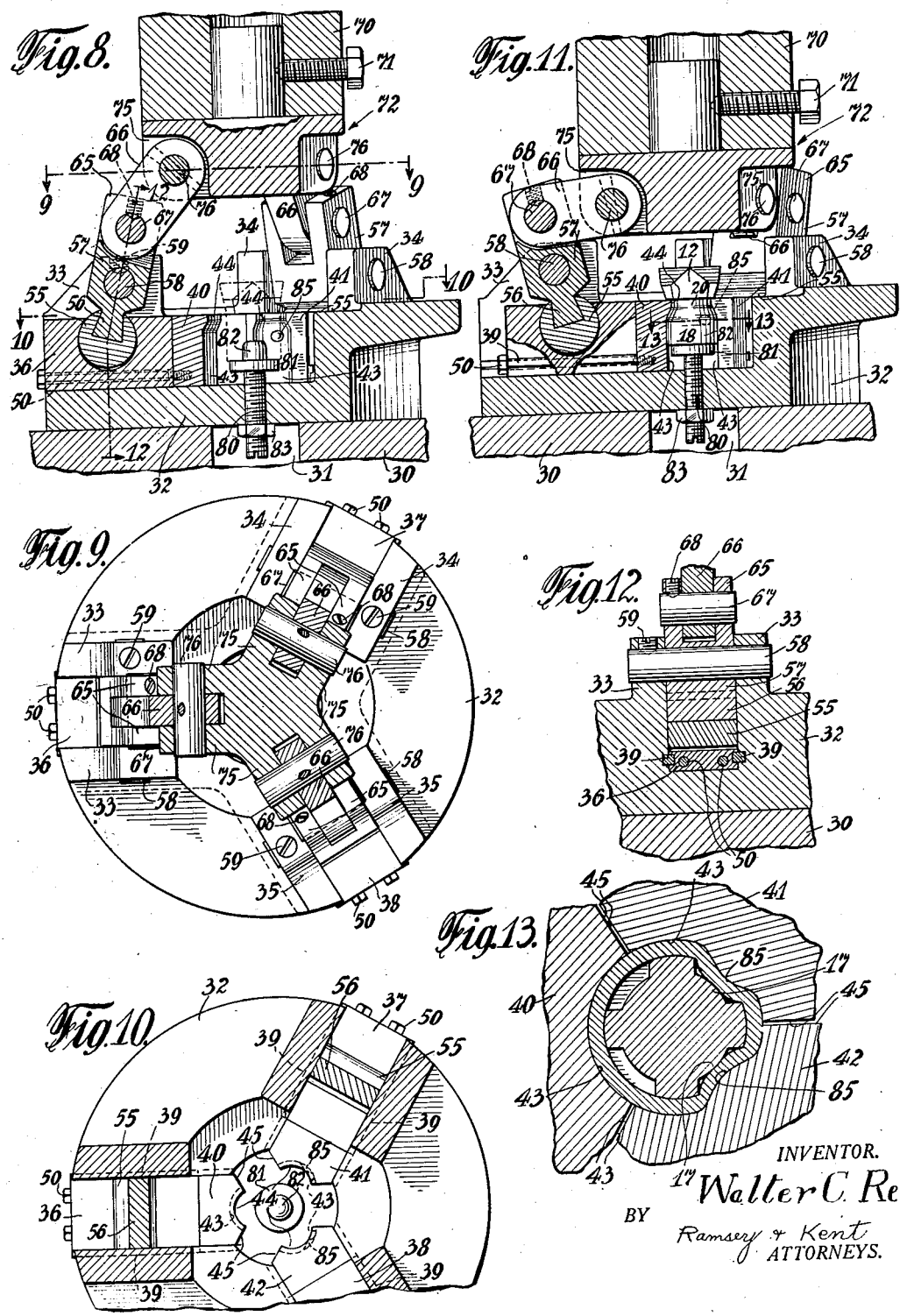

Patented Oct. 10, 1933

1,929,608

UNITED STATES PATENT OFFICE

1,929,608

DRILL BIT AND METHOD OF MAKING THE SAME

Walter C. Rea, Lancaster, Pa., assignor to Economy Rock Bit Corporation, Lancaster, Pa., a corporation of Pennsylvania Application August 14, 1931, Serial No. 557,086, and in Canada November 19, 1931

9 Claims. (Cl. 76—108)

This invention relates to drill bits and methods of making the same, and more particularly to drill bits used for drilling rock and the like and means and methods for making the same.

Heretofore various types of bits have been used for drilling rock and the like, some of the bits being detachable and some being affixed directly to the end of drill rods of various lengths. All of such bits, however, have possessed some inherent disadvantage such as difficulty and cost of manufacture, difficult to use, etc.

An object of the present invention is to provide an improved bit which can be attached to or detached from drill rods of various lengths.

A further object of the invention is to provide methods of manufacturing bits of the character set forth.

The difficulties heretofore encountered in the manufacture and use of rock drill bits are overcome in the present invention in the following manner: The bits which are used in connection with drills or hammers of various types, such mechanisms generally employing percussion for driving and rotating the bits, comprise actually two parts, one of which is the bit proper, and the other of which is a collar secured to the bit and internally threaded for attachment to and detachment from drill rods of desired lengths. The bit proper is first forged into shape in which the cutting edges have prolongations in the nature of ribs extending from the center hub. After the bit has been forged the same is machined to cut away a portion of the ribs, leaving in effect knobs extending outwardly from the hub. A collar is provided for attachment to the bit, such collar having a portion of enlarged internal diameter at one end and being internally threaded the remainder of its length as shown.

After the two parts, namely, the bit proper and the collar, have been formed, the collar is inserted over the hub of the bit and the two parts positioned in a press for uniting them.

The press consists of a stationary part or bed and a movable part or plunger connected by means of moving parts to the stationary part or bed. The bed is provided with upstanding guide-ways in which are slidable a number of horizontally moving squeezing members, the squeezing faces of which cooperate to form a complete circle. These sliding members are connected by means of links to the plunger so that on downward movement of the plunger the members move inwardly, bringing the squeezing faces into contact with the periphery of the collar, and upon continued movement, these squeezing faces intrude a part of the collar into the space between the knobs and the shoulder extending from the hub of the bit. If so desired, a small knob or protuberance may be positioned on one or more of the squeezing surfaces to cause the intrusion of some of the material of the collar into one or more of the depressions between the various ribs on the bit itself.

Other features, objects, and advantages of the present invention will become apparent by reference to the following detailed description read in the light of the accompanying drawings, wherein:

Fig. 1 is a perspective view of the bit after the completion of the forging operation;

Fig. 2 is a top or plan view of the forging shown in Fig. 1;

Fig. 3 is a perspective view of the bit after the completion of the machining operation showing the knobs formed from the splines thereof;

Fig. 4 is a perspective view partially in section of a threaded collar to be secured to the hub of the bit shown in Fig. 3;

Fig. 5 is a vertical section of the assembled bit and collar before the collar has been securely fastened to the bit;

Fig. 6 is also a vertical section of the bit and collar with the collar securely fastened to the bit;

Fig. 7 is a broken section showing the manner in which the collar is fastened to the bit proper, taken at a slightly different point from that section on which Fig. 6 is based;

Fig. 8 is a vertical section through a press utilized in joining the parts forming the detachable bit of the present invention, showing the squeezing members in open position;

Fig. 9 is a section taken substantially on line 9—9 of Fig. 8;

Fig. 10 is a fragmentary section taken on substantially line 10—10 of Fig. 8;

Fig. 11 is a section similar to Fig. 8, showing the squeezing members in closed position;

Fig. 12 is a section taken substantially on the line 12—12 of Fig. 8, and

Fig. 13 is an enlarged section taken substantially on line 13—13 of Fig. 11.

Referring now to the drawings and particularly to Figs. 1 and 2, 10 indicates generally a drill bit in forged form, such bit having cutting edges 11 from which extend inwardly and upwardly sloping ribs 12 separated by what serves as splines, the surfaces of which slope inwardly and upwardly at an angle slightly less than that of the surfaces of ribs 12. The center part of the bit, indicated at 13, serves as a hub from which the ribs 12 extend.

Referring now to Fig. 3, it will be seen that the member shown in Figs. 1 and 2 has been machined to cut away a large part of each rib 12 to form knobs 14 and also to form a shoulder 15 spaced from the knobs 14 by a channel 16 extending completely around the hub of the bit and of such depth as to cut below the surface of the splines separating the ribs 12. By so undercutting the splines, an annular hump, as shown at 17, extends between the lower part of each knob 14, which lower part is rounded off as shown. In this condition, the bit is ready for adjustment to an internally threaded collar 18, which is shown partially broken away in Fig. 4. The threads 19 extend a part of the way the length of the collar 18, terminating some distance from the bottom thereof, from which point onward the collar is provided with a portion of increased diameter 20. Before the collar and bit proper are assembled, it may be advisable to drill the usual center hole 21 through the bit, but if so desired, this drilling may be postponed until the collar and bit proper have been assembled. To facilitate drilling the center hole 21, a small dish-like depression 22 is forged into the top of the forging shown in Figs. 1 and 2, which depression permits the bit to be more easily started. For a similar reason, the surface of the forging indicated at 23 centrally located of the cutting edges is made substantially flat so that drills will not be broken when they pierce this surface.

The collar and the bit proper are assembled as shown in Fig. 5 with the portion of enlarged diameter 20 fitting over the respective knobs 14. In this condition the assembly is placed in a press of the character shown in Figs. 8 to 13 inclusive and pressure is applied to intrude or force the lower part of the collar into the channel 16. At the same time, the knobs on the squeezing faces before mentioned force a small amount of the material of the collar into one or more of the splines, as shown as 24. This latter arrangement absolutely prevents any turning of the collar relative to the bit, while withdrawal of the collar from the bit is positively prevented by the locking of the collar into a continuous channel cut into the hub of the bit.

Referring now to Figs. 8 to 13 inclusive, the mechanism illustrated therein is adapted for use in connection with a punch of conventional character wherein a plunger of limited stroke is employed. The mechanism consists of a table 30 of any suitable character provided substantially centrally with an opening 31. Supported by the table 30 is a bed member or base 32 which has extending upwardly therefrom a number of pairs of guide and bearing bosses 33, 34, and 35. A part of the material of the bed 32 is cut away beneath and between the respective pairs of bosses 33 to provide slide-ways for sliding members 36, 37, and 38 between the bosses of the respective pairs. The respective sliding members 36, 37 and 38 are held against upward movement by means of keys 39 fitting in key-ways both in the sides of the slide-ways and in the sliding members themselves. Secured to the inner end of each sliding member 36, 37, and 38 are three plates 40, 41 and 42 respectively, the inner edges or surfaces of each plate being provided centrally with an arcuate-shaped face, as indicated at 43, topped by a similarly shaped shoulder 44. The respective curved faces 43 of the three plates combine when the squeezing members are moved inwardly to form a complete circle; the remainder of the plates 40, 41 and 42 being cut away as at 45 to permit the plates to come together. The respective plates 40, 41, and 42 are secured to their sliding members by means of bolts 50 extending through the sliding members and screwed into the plates.

Rotatably embedded in the sliding member 36 is a rod 55 which has dovetailed therewithin an extension 56 of an arm 57. This arm 57 is rotatably mounted on a shaft 58 locked in and between the bosses 33 by means of a set screw 59 or by any other suitable arrangement. The upper end of the arm 57 is forked to form prongs 65 between which fits an arm 66, which arm 66 has passing therethrough a shaft 67 mounted in the respective prongs 65 and held against movement by a set screw 68 or by any other suitable arrangement.

Secured to the plunger 70 of the press by means of a set screw 71 is a head member indicated generally at 72, which head member has three forked portions corresponding to the three sets of bosses in the bed plate. The other end of the arm 66 is mounted between the prongs 75 forming one pair of the three shown in the drawings. A shaft 76 passes through the prongs 75 and also through the arm 66. A similar construction of arms is provided for each of the other pairs of bosses and since the construction is the same, it is not described in detail herein.

To form a suitable base for the assembled collar and bit, a threaded rod 80 extends through the middle of the bed 32 and a washer-like support 81 is provided near the upper end of the bolt, which upper end terminates in a knob 82. A nut 83 serves to lock the bolt 80 in whatever position it is turned to. A small knob of metal or protuberance 85 is provided on one or more of the squeezing surfaces 43 for forcing some of the metal of the collar into the space between the respective knobs 14, as pointed out hereinbefore.

With the mechanism hereinbefore described in condition for operation, such operation is substantially as follows:

Assuming that the movable head is in uppermost position, as shown in Fig. 8, an assembled collar and bit is positioned with the collar resting on the washer 81 saddling the knob 82. Power is applied to move the head 72 downwardly as a result of which the lower portion of arm 66 is swung outwardly, in turn rotating the lower part of this arm about the shaft 58, rotating the rod 55 within the sliding member 36, and forcing it inwardly. Simultaneously the other respective linkages force the sliding members 37 and 38 inwardly. As these members move inwardly, the shoulders 44 on the squeeze blocks 40, 41 and 42 come into contact with the outer surface of the collar positioned centrally on the device, and upon continued movement, these shoulders 44 force the material of the collar into the shape shown in Fig. 11, wherein the squeeze blocks have reached the end of their inward travel. Upon upward movement of the head 72, the sliding movement of the members 36, 37 and 38 is reversed so that the squeezing blocks move away from the assembly, permitting it to be removed and another assembly placed in its stead. By reason of the adjustability of the height of supporting washer 81, it is possible to utilize the same machine for collars of various lengths since it is only necessary to assure the assembly being so positioned that the shoulders 44 can force the material of the collar into channel 16.

From the foregoing it will be seen that the present invention provides a detachable bit of many advantages such as simplicity of manufacture and inexpensiveness. Furthermore, the device can be manufactured with the utmost efficiency by means of the mechanism described in detail herein, which mechanism is actuated entirely by a single power stroke of a puncher.

Having described my invention, I claim:

1. In a device of the character described, a bit having a hub extending away from a shoulder of said bit, a plurality of key members spaced around said hub and spaced from said shoulder, and a hollow collar internally threaded, said collar being permanently secured to said hub.

2. In a device of the character described, a bit having a hub extending away from a shoulder of said bit, a plurality of key members spaced around said hub and spaced from said shoulder, a hollow collar internally threaded, said collar being permanently secured to said hub by the intrusion of some of the material of said collar into the space between said keys and said shoulder.

3. In a device of the character described, a bit having a hub extending away from a shoulder of said bit, a plurality of key members spaced around said hub and spaced from said shoulder, a hollow collar internally threaded, said collar being permanently secured to said hub by the intrusion of some of the material of said collar into the space between said keys and said shoulder, and into the space between certain of said keys.

4. In a device of the character described, a bit having a tapering hub extending away from a shoulder of said bit, a plurality of key members spaced around said hub and spaced from said shoulder, said bit being provided with a channel extending into and around said hub between the keys and the shoulder, and a hollow internally threaded collar permanently secured to said bit above said shoulder by the intrusion of some of the material of the collar into said channel.

5. In a device of the character described, a bit having a tapering hub extending away from a shoulder of said bit, a plurality of key members spaced around said hub and spaced from said shoulder, said bit being provided with a channel extending into and around said hub between the keys and the shoulder, and a hollow internally threaded collar permanently secured to said bit above said shoulder by the intrusion of some of the material of the collar into said channel and into the space between certain of said keys.

6. The method of making a bit which comprises shaping a bit member with a hub having a plurality of keys spaced therearound and from a shoulder of the bit, providing a collar with internal threads, and securing said collar to said hub by intruding some of the material of the enlarged end into the space between said keys and said shoulder.

7. The method of making a bit which comprises shaping a bit member with a hub having a plurality of keys extending therefrom, cutting a channel into said hub to form a shoulder on the bit member, and permanently securing an internally threaded collar to said bit member with an end thereof against said shoulder by intruding some of the material of said collar into said channel.

8. The method of making a bit which comprises shaping a bit member with a tapering hub and tapering keys spaced therearound, cutting away the keys until the surfaces thereof are substantially parallel to the axis of the bit member, forming a shoulder intermediate the length of the bit member by cutting a channel thereinto, and securing an internally threaded collar to said bit member by intruding some of the material of the collar into said channel.

9. The method of making a bit which comprises shaping a bit member with a tapering hub and tapering keys spaced therearound, cutting away and keys until the surfaces thereof are substantially parallel to the axis of the bit member, forming a shoulder intermediate the length of the bit member by cutting a channel thereinto, and securing an internally threaded collar to said bit member by intruding some of the material of the collar into said channel, and into spaces between the keys.

WALTER C. REA.